(12) United States Patent
Watanabe et al.

(10) Patent No.: US 6,934,240 B2
(45) Date of Patent: Aug. 23, 2005

(54) OPTICAL ELEMENT, OPTICAL HEAD AND SIGNAL REPRODUCING METHOD

(75) Inventors: Kenjiro Watanabe, Tokyo (JP); Hitoshi Tamada, Kanagawa (JP)

(73) Assignee: Sony Corporation (JP)

( * ) Notice: Subject to any disclaimer, the term of this patent is extended or adjusted under 35 U.S.C. 154(b) by 518 days.

(21) Appl. No.: 09/833,640

(22) Filed: Apr. 13, 2001

(65) Prior Publication Data

US 2003/0206513 A1 Nov. 6, 2003

(30) Foreign Application Priority Data

Apr. 14, 2000 (JP) ..................................... P2000-118554

(51) Int. Cl.$^7$ ............................................... G11B 7/00
(52) U.S. Cl. .................. 369/112.23; 369/118
(58) Field of Search ........................... 369/118, 112.23, 369/112.27, 44.23, 44.24, 112.01, 44.11, 106

(56) References Cited

U.S. PATENT DOCUMENTS 6,434,088 B1 * 8/2002 Ishizaki et al. .......... 369/13.33
6,700,856 B2 * 3/2004 Ueyanagi ................ 369/112.23

OTHER PUBLICATIONS

Apertureless Near–field Optical Microscope, F. Zenhausern, et al, Appl. Phys. Lett. 65(13), Sep. 2, 1994.

Optical Data Storage Read Out at 256 Gbits/sq. In., Y. Martin, et al, Appl. Phys. Lett. 71(1), Jul. 7, 1997.

* cited by examiner

Primary Examiner—Nabil Hindi
(74) Attorney, Agent, or Firm—Rader, Fishman & Grauer PLLC; Ronald P. Kananen

(57) ABSTRACT

An optical element is provided in which in a lens surface substantially perpendicular to the optical axis of the lens, there is embedded a conductive member whose diameter or width is smaller than the diameter of an optical spot incident upon the lens surface. The optical element is used in an optical head which reads a signal by illuminating an optical recording medium with a reading light. The basic principle of this optical head is such that a subtle phase change of the light is detected which is caused by the electromagnetic interaction between the conductive member embedded in the optical element and a conductive material on the surface of the optical recording medium. For example, the interference between return light beams from the optical recording medium is used to read a signal. Alternately, a high frequency current is supplied to the conductive material and a signal synchronous with the high frequency is extracted to detect the interaction between the conductive material on the optical recording medium and the conductive member, to thereby read a signal recorded in the optical recording medium.

7 Claims, 5 Drawing Sheets

NA=n×nSinθ

NA=nSinθ

OPTICAL ELEMENT, OPTICAL HEAD AND SIGNAL REPRODUCING METHOD

BACKGROUND OF THE INVENTION

1. Field of the Invention

The present invention relates to a novel optical element capable of detecting a smaller mark than an optical spot, an optical head using the optical element and a signal reproducing method using the optical head.

2. Description of the Related Art

In the field of optical recording, it has been demanded to record a signal in a higher density. To meet such a demand, various recording and reproducing methods have been proposed.

For example, in the technical field of the optical heads which read a signal by illuminating an optical recording medium with a reading light, it has been proposed to use a solid immersion lens (will be referred to as "SIL" hereunder) or a solid immersion mirror (will be referred to as "SIM" hereunder) as an optical element in order to write and/or read a signal in a high density, and a fringing light in a near field to read a signal with a rather higher numerical aperture (NA) than ever.

On the other hand, it has been proposed to dispose a metal needle at the end of an interference microscope in order to measure the shape of an object under examination.

The metal needle is sharpened to have a point of about 100 nm. This sharp end will have an electromagnetic interaction with a very thin coating of Cr on the surface of the object under examination. The magnitude of the interaction depends upon the distance between the needle point and Cr coating.

A light converged to the needle point will have the wave phase thereof shifted due to the above electromagnetic interaction. The wave shift is on the order of $10^{-8}$/Hz but can be detected using the phase difference interference between the needle point and a light from a remote location (refer to "Apertureless Near-field Optical Microscope" F. Zenhausern, M. P. O' Boyle and H. K. Wickeramasinghe, Appl. Phys. Lett. 65(13), Sep. 2, 1994, and "Optical Data Storage Read Out at 256 Gbits/sq. in." Y. Martin, S. Rshton and H. K. Wickeramasinghe, Appl. Phys. Lett. 71(1), Jul. 7, 1997).

It is expectable that the above principle permits to detect a signal with a higher resolution than by the SIL and SIM. However, the principle has not yet been used in practice in the field of optical recording. For example, the cantilever has to always be at a constant distance from the surface of an optical disc to effectively implement the principle in the technique disclosed in the above documents, the optical disc is illuminated with a laser light other than the reading light from behind the cantilever and a servo control is made according to the movement of the laser light to control the distance between the needle point and disc to be tens of nm. However, since the cantilever is moved slowly, no high-speed reading is possible.

OBJECT AND SUMMARY OF THE INVENTION

It is therefore an object of the present invention to overcome the above-mentioned drawbacks of the prior art by facilitating the introduction of the above principle into the field of optical recording.

More particularly, the present invention has an object to provide an optical element which can detect a smaller mark than an optical spot focused by the optical system, optical head using the optical element and a signal reproducing method using the optical head.

The above object can be attained by providing an optical element having embedded in the surface of a lens substantially perpendicular thereto a conductive member whose diameter or width is smaller than the diameter of an optical spot on the lens surface.

Also the above object can be attained by providing an optical head having an optical element installed on a slider thereof and which reads a signal by illuminating an optical recording medium with a reading light, the optical element having embedded in the surface of a lens substantially perpendicular thereto a conductive member whose diameter or width is smaller than the diameter of an optical spot on the lens surface.

Further the above object can be attained by providing a signal reproducing method including, according to the present invention, steps of: splitting a laser light from the same source for incidence upon an optical element to form two optical spots on the focal plane of the optical element, disposing, in a position corresponding to one of the optical spots, a conductive member whose diameter or width is smaller than the diameter of the optical spot, and taking the optical spot incident on the conductive member as a detection light while taking another optical spot as a reference light and reading a signal under the effect of an interference between return light beams from the optical recording medium.

Alternately, the above object can also be attained by providing a signal reproducing method including, according to the present invention, steps of: illuminating an optical element with a laser light, disposing a conductive member in the position of an optical spot resulted from the laser light and supplying the conductive member with a high frequency current, and detecting an interaction between a conductive material on an optical recording medium and the conductive member by extracting a signal synchronous with the high frequency and reading a signal recorded in the optical recording medium.

The basic principle of the present invention is such that a subtle phase change of the light is detected which is caused by the electromagnetic interaction between the conductive member embedded in the optical element and a conductive material on the surface of the optical recording medium.

The conductive member has a diameter or width smaller than the diameter of the optical spot on the lens surface. Therefore, a smaller mark than the optical spot can be detected.

Also, the conductive member is embedded integrally with the optical element. Thus, the optical head needs no complicated servo control mechanism and a high speed reading is possible.

These objects and other objects, features and advantages of the present intention will become more apparent from the following detailed description of the preferred embodiments of the optical element, optical head and signal reproducing method according to the present invention when taken in conjunction with the accompanying drawings.

DETAILED DESCRIPTION OF THE PREFERRED EMBODIMENTS

Referring now to FIGS. 1 to 4, there are illustrated embodiments of the optical element each having a conductive member embedded in a semi-spheric lens thereof. The semi-spheric lens is a typical one capable of phase detection in a near field where an SIL is used.

Figure 1:
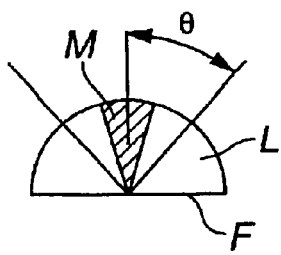
FIG. 1 is a schematic view of an example SIL in which a metal is embedded.
Figure 2:
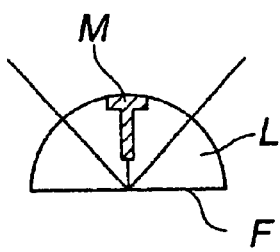
FIG. 2 is a schematic view of another example SIL in which a metal is embedded.

In the optical element shown in FIG. 1 for example, a conical metal piece M is embedded as the conductive member in the center of the optical axis of the semi-spheric lens L. FIG. 2 shows an optical element having embedded in the semi-spheric lens L thereof as the conductive member a metal piece M whose diameter is stepwise decreased towards the end of the semi-spheric lens L.

Figure 3:
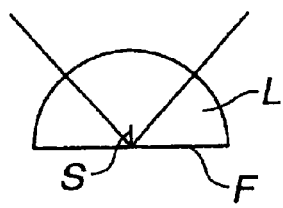
FIG. 3 is a schematic view of an example SIL in which a fine Si is embedded.
Figure 4:
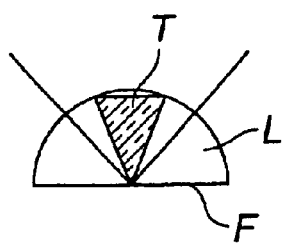
FIG. 4 is a schematic view of an example SIL in which a transparent conductive material is embedded.

FIG. 3 shows an embodiment of the optical element having embedded in the semi-spheric lens L a fine metalloid piece S (for example, Si) of hundreds of nm in diameter. FIG. 4 shows an embodiment of the optical element having a conical transparent conductive material T embedded as the conductive member in the center of the optical axis of the semi-spheric lens L thereof.

In any of the above optical elements, there is embedded the conductive member (metal piece M, metalloid piece S and transparent conductive material T) whose end diameter is smaller than that of an optical spot focused in a focal plane F by the semi-spheric lens L, and end point is directed into the optical spot in the focal plane F of the semi-spheric lens L.

Note that in the SIL such as in each of the above optical elements, a light will be incident upon the semi-spheric lens L perpendicularly to the latter. At this time, the diameter of the optical spot on the bottom of the semi-sphere (focal plane F) depends upon 1.22×(wavelength/NA (numerical aperture) )where NA is nSin θ (n: refractive index).

In the above construction of the optical element, the conductive member (metal piece M, metalloid piece S or transparent conductive material T) should be formed to have such a shape as will not interfere with a light incident upon the semi-spheric lens L, namely, as will not refract the light or will not influence the locus of the light by reflection.

Thus, since the central portion of the optical axis is cut off by the metal or metalloid piece before incident upon the lens, the optical spot on the lens bottom (focal plane F) will be an optical spot of an ultra-high resolution.

The transparent conductive material T will also not disturb the light locus when it is formed conical.

Since a geometric error of an approximate half of a wavelength used will not disturb the light and thus allowed, a metal ball of hundreds of nm in diameter, for example, can be embedded.

Figure 5:
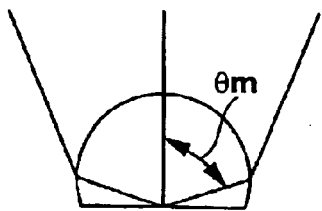
FIG. 5 is a schematic view of an example super SIL.
Figure 6:
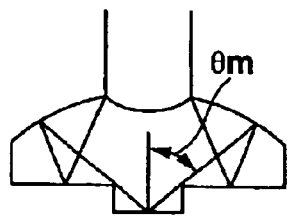
FIG. 6 is a schematic view of an example SIM.

Also, the present invention is applicable to a super SIL as shown in FIG. 5 and an SIM as shown in FIG. 6, in addition to the aforementioned SIL, and also to an objective lens.

When the above optical element is used to read pits and grooves in an optical disc for example, an electromagnetic interaction will take place between the conductive member embedded in the optical element and a recording layer (for example, Cr) coated on the surface of the optical disc. The electromagnetic interaction depends upon the distance between the conductive member and Cr-coated surface of the optical disc.

When a light is focused at a needle point (end portion of the conductive member), the focused light will incur a light-wave phase shift due to the above electromagnetic interaction. By detecting this phase shift by the use of the effect of a phase difference interference with the reference light, it is possible to read a signal taking the diameter of the end point of the conductive member as a resolution, and read smaller pits and grooves than the focus optical spot. More particularly, a signal is read by splitting a laser light from the same source for incidence upon an optical element to form two optical spots on the focal plane of the optical element, disposing, in a position corresponding to one of the optical spots, a conductive member whose diameter or width is smaller than the diameter of the optical spot, and taking the optical spot incident on the conductive member as a detection light while taking another optical spot as a reference light and reading the signal under the effect of an interference between return light beams from the optical recording medium.

The phase difference measured is expressed by the following equation.

$$\Delta\varphi = \frac{5}{9}(ka)^3 \frac{NA^2}{n^2} \text{Re}[\chi 1, \chi 2]$$

where a: end point diameter of probe
NA: Numerical aperture of lens
χ1, χ2: Magnetization factor As will be seen, the magnetization factor χ of Si is 14.0+14i and the phase difference Δφ depends upon the product with χ(=−1.4+37.4i) of Cr coated on the optical disc surface.

Therefore, a conductive material in which the imaginary part of the magnetization factor χ is large such as Au(χ=0.188+5.39i) or Al(χ=2.80+8.45i) should desirably be used as the conductive member (metal piece M, metalloid piece S or transparent conductive material T) besides Cr and Si.

Figure 7A:
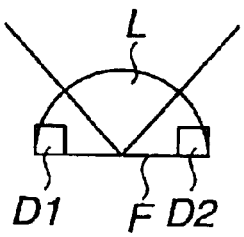
FIG. 7 is a schematic view of an example SIL in which a conductive member is embedded.
Figure 7B:
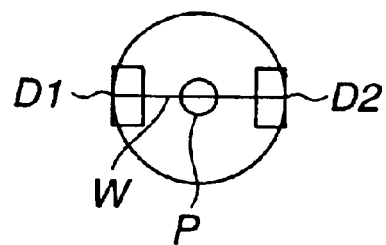

As one of such conductive materials, there may be disposed a wire W of hundreds of nm in width to cross the optical spot P on the focal plane F of the SIL as shown in FIG. 7. In this case, electrodes D1 and D2 may be provided at opposite ends of the wire W for a current to flow through the wire W, whereby the electromagnetic interaction can be increased.

For example, a laser light can be emitted to the SIL, a high frequency current is supplied to the wire W, a signal synchronous with the high frequency is extracted to detect the interaction between the conductive material on the optical disc surface and the wire W, and thus a signal recorded in the optical recording medium can be read with a high sensitivity.

It should be noted that by such an arrangement that the direction of the laser light deflecting surface and the direction of the current are substantially perpendicular, or substantially parallel, to each other, it is possible to detect, with a high accuracy, a change of the deflecting surface of the recording layer in the optical recording medium.

Also, by reading a signal while moving the optical element in a direction perpendicular to the wire W, it is possible to read the signal with a resolution which is the width of the wire W.

Next, the optical head using the aforementioned optical element will be described, and also the signal reproducing method using the optical head will be described.

Figure 8:
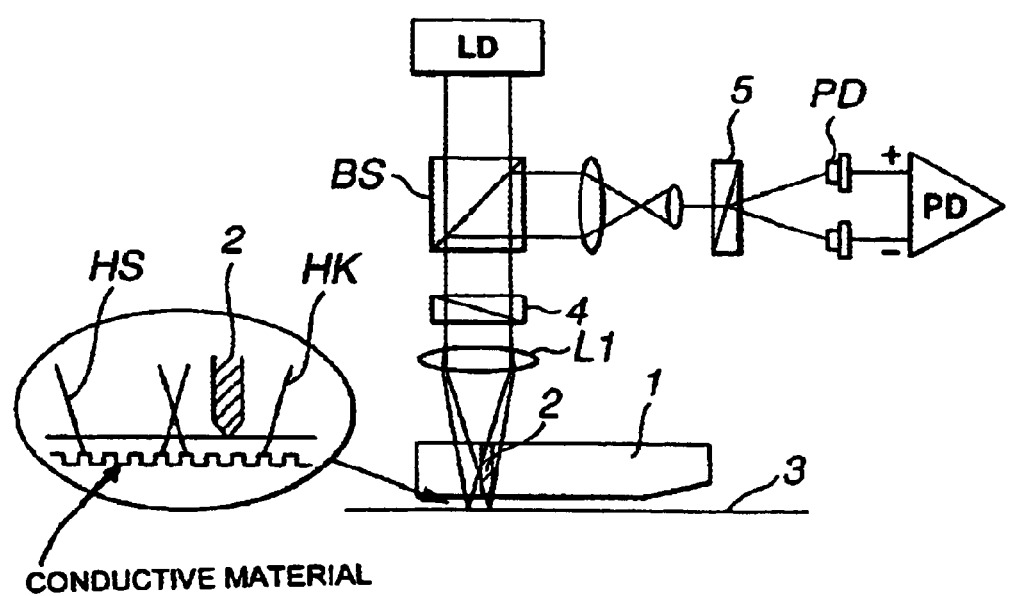
FIG. 8 schematically illustrates an example construction of the optical head according to the present invention.

Referring now to FIG. 8, there is illustrated an embodiment of the optical head according to the present invention, in which the slider and optical element are integral with each other and a conductive member is embedded in the optical element.

The optical head includes a glass slider 1 which serves as a lens, and a metal piece 2 embedded in the slider 1. In this optical head, a laser light emitted from a laser diode LD is guided to the glass slider 1 via a beam splitter BS and condenser lens L1, and converged to the surface of an optical recording medium 3, to thereby read a signal from the optical recording medium 3.

In this embodiment, the laser light from the laser diode LD is split at a slight angle by a Wollaston prism 4 disposed between the beam splitter BS and condenser lens L1. One of the split light beams is converged to the end point of the metal piece 2 as a detection light HK while the other is converged, as a reference light HS, to a position where the metal piece 2 is off the focus spot.

It should be noted that in FIG. 8, the condenser lens L1 and glass slider 1 are shown as if they were separate from each other but they should be integral with each other.

A return light from the optical recording medium 3 is guided by the beam splitter BS to a photodetector PD. The return light is also split by the Wollaston prism 5.

When reading a signal from the optical recording medium 3 by means of the optical head this constructed, a phase difference between the detection ling HK and reference light HS is detected by interferometry.

The difference between the end point of the metal piece 2 and recording layer (conductive layer) on the surface of the optical recording medium 3 will vary from when the end point of the metal piece 2 is opposite to a convexity of a pit on the optical recording medium 3 to when it is opposite to a convexity of the pit. Thus, the magnitude of the electromagnetic interaction will vary, so the phase shift will change slightly.

The change in phase shift is detected by the interferometry to rad the pit (signal).

Figure 9:
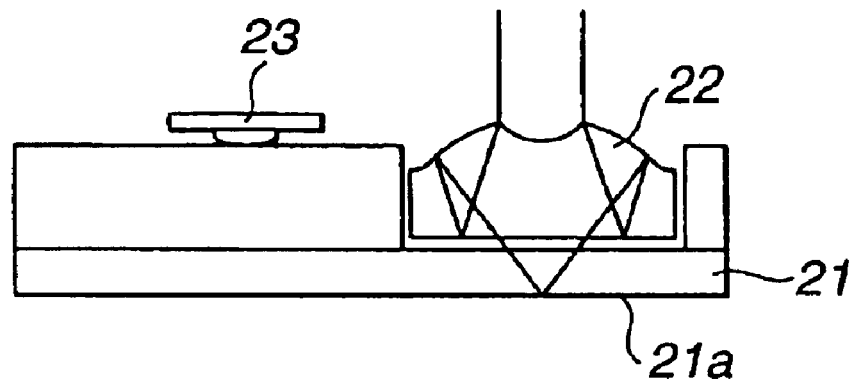
FIG. 9 is a schematic side elevation of an example optical head having an SIM installed thereon.
Figure 10:
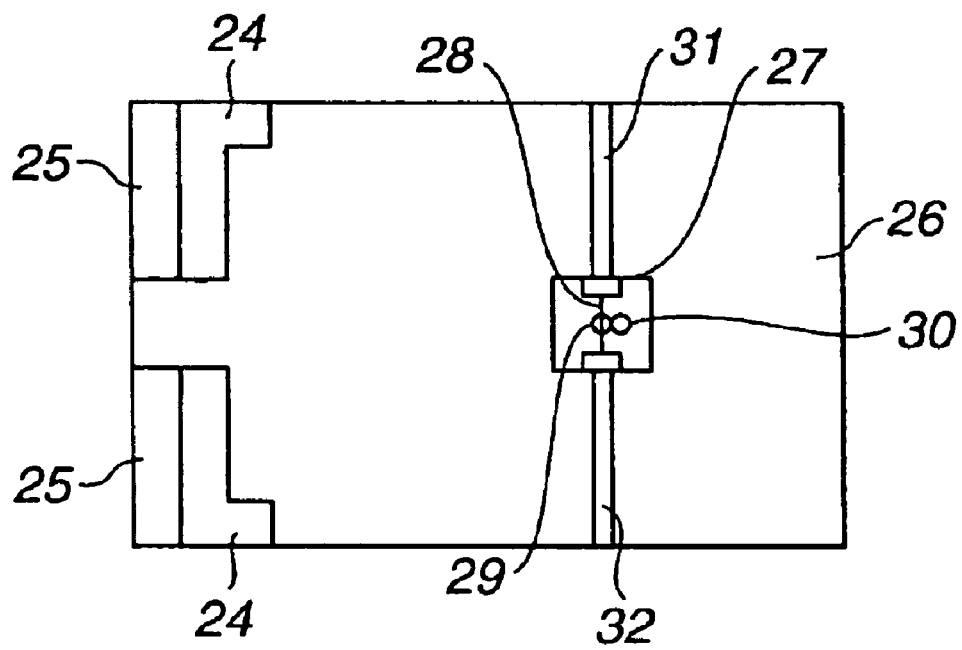
FIG. 10 is a generally plan view showing the side of the optical head shown in FIG. 9, facing the optical recording medium.

FIGS. 9 and 10 show an embodiment of the optical head having an SIM installed therein. As shown, in this optical head, an SIM 22 is mounted on a glass slider 21 and secured to the latter with an adhesive.

The glass slider 21 is supported on a suspension 23 and installed in an optical disc drive or the like.

The glass slider 21 is 291 $\mu$m thick and can be levitated 60 nm.

The glass slider 21 has a side 21a thereof facing the optical recording medium. The side 21a is formed from a rail surface 24, a front step 25, and a vacuum channel 26. The rail surface 24 is convex, and the front step 25 is recessed 0.35 $\mu$m from the rail surface 24. The vacuum channel 26 is recessed about 3 $\mu$m from the rail surface 24.

Therefore, when the glass slider 21 is being levitated, the rail surface 24 will be nearest to the surface of an optical disc.

The vacuum channel 26 has a center island 27 as high as the rail surface 24 and which the bottom (focal plane) of the SIM 22 will face. An Si wire 28 of 300 nm is provided on the center island 27.

The Si wire 28, detection light spot 29 and reference light spot 30 are located in a relationship as shown. That is, the Si wire 28 is disposed to cross the detection light spot 29, and the reference light spot 30 is positioned off the Si wire 28.

Also the Si wire 28 has lead wires 31 and 32 connected to both ends thereof, respectively, so that a current can be supplied to the Si wire 28. The lead wires 31 and 32 are disposed on the bottom of the vacuum channel so as not to influence the levitation of the glass slider 21, and a 300 nm-wide recess for laying the Si wire 28 is formed in the center of the center island 27 being also the rail surface.

The Si wire 28 may be formed by forming the glass slider 21 for example, then forming a recess of 300 nm in width and 500 nm in depth by patterning, sputtering Si, removing the Si material from other than the recess by the lift-off method, and then by kiss-lapping, for example.

Figure 11:
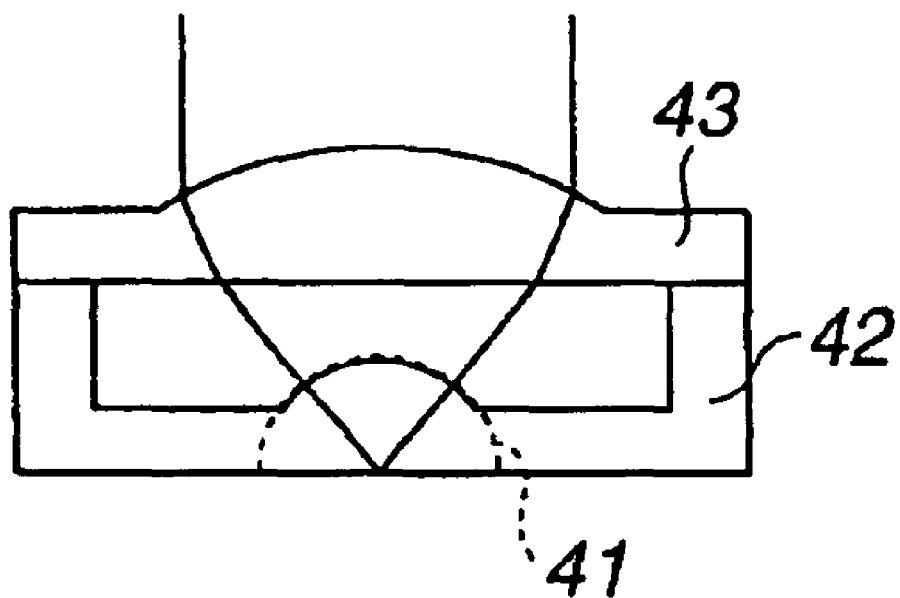
FIG. 11 is a schematic view of an example SIL installed in the optical head according to the present invention.

The SIL may be constructed similarly. FIG. 11 shows an example SIL in which a semi-spheric lens 41 is embedded in a glass substrate 42 and integrated with a condenser lens substrate 43.

In this optical head, the optical system is so constructed to project to the lens a parallel light after split at a slight angle by the Wollaston prism, and a spot focused by the lens defines a light spot on the slider bottom.

At the slider bottom, the spot size was 0.6 $\mu$m (for NA=1.3) in the example SIM slider. It was 0.7 $\mu$m(for NA=1.0) in the case of SIL slider.

The two spots were arranged about 2 $\mu$m off each other. The optical disc has pits and lands of 50 nm in length formed in a glass substrate thereof and also has a Cr coating of 50 nm in thickness formed on the surface.

The slider was levitated 40 nm (at a linear velocity of 10 m/s) on the optical disc.

While a weak current having a high frequency of 100 MHz to 4 GHz ($f_0$) (sufficiently higher than the data rate) is supplied to the lead wires, a signal is acquired by synchronizing a differentiation between the two split light beams with the high frequency ($f_0$), thereby permitting to detect a random pattern corresponding to the length of a mark of 50 nm on the optical disc.

Similarly, according to the present invention, recording mark can be detected on an optical disc in which information is recorded by means of pits and lands formed on the aforementioned substrate as well as on a phase-change type optical disc. In a phase-change type optical disc, recording marks different in refractive index from each other are photo-thermally formed to a signal recording layer formed from a phase-change material such as GeSbTe. A difference in refractive index in the phase-change type optical disc means a difference in magnetization factor $\chi$. Therefore, according to the present invention, recording marks of small pit length formed in the phase-change optical disc could be detected in the same manner as in the above.

Similarly, by forming the conductive member from a highly permeable material such as Permalloy or a ferromagnetic material such as iron, it was possible to detect fine magnetic domains on a magneto-optic or magnetic recording medium.

For example, a Permalloy piece of 200 nm in width may be disposed on the slider bottom, and a high frequency current be supplied to the Permalloy piece. A local fine magnetic field thus developed will incur a slight change in magnetic field distribution due to the upward and downward magnetic domains on the optical disc. The change in magnetic field distribution is detected as a change in light phase due to an interaction with the light.

As having been described in the foregoing, a small spot defined by a near-field optical system is used and a smaller conductive member than the light spot is focused on the optical disc, thereby permitting to detect pits and lands of some 10 nm on an optical disc and fine magnetic domains on a magnetic recording medium.

As will be seen from the foregoing description, according to the present invention, finer marks than optical spot can be detected.

Also, the present invention will thus make unnecessary the complicated servo control mechanism, and implement a high speed reading.

What is claimed is:

1. An optical head having an optical element installed on a slider thereof and which reads a signal by illuminating an optical recording medium with a reading light, the optical element having embedded in the surface of a lens substantially perpendicular thereto a conductive member whose diameter or width is smaller than the diameter of an optical spot on a lens surface, wherein there is provided an electrode to supply the conductive member with a current.

2. A signal reproducing method comprising the steps of:

splitting a laser light from a same source for incidence upon an optical element to form two optical spots on the focal plane of the optical element;

disposing, in a position corresponding to one of the optical spots, a conductive member whose diameter or width is smaller than the diameter of the optical spot, and taking the optical spot incident on the conductive member as a detection light while taking another optical spot as a reference light and reading a signal under the effect of an interference between return light beams from the optical recording medium.

3. A signal reproducing method comprising the steps of:

illuminating an optical element with a laser light, disposing a conductive member in the position of an optical spot resulted from the laser light and supplying the conductive member with a high frequency current; and detecting an interaction between a conductive material on an optical recording medium and the conductive member by extracting a signal synchronous with the high frequency and reading a signal recorded in the optical recording medium.

4. The signal reproducing method as set forth in claim 3, wherein the directions of the laser light deflecting surface and current are substantially perpendicular, or substantially parallel, to each other.

5. The optical element as set forth in claim 1, wherein the optical element is one selected from among a semi-spheric lens, a super solid immersion lens and an objective lens.

6. The optical element as set forth in claim 1, wherein the conductive member is made from at least one of a metal, a metalloid and a transparent conductive material having a different refractive index from the refractive index of the lens material.

7. The optical element as set forth in claim 1, wherein the optical element is integrated with the slider.

* * * * *